Nov. 4, 1958     H. V. ALEXANDERSSON     2,858,706
FRICTION GEAR

Filed May 24, 1955

INVENTOR
HARALD VALDEMAR ALEXANDERSSON
By Hane and Nydick
ATTORNEYS

United States Patent Office 2,858,706
Patented Nov. 4, 1958

2,858,706
FRICTION GEAR

Harald Valdemar Alexandersson, Lidingo, Sweden, assignor to Telefonaktiebolaget L M Ericsson, Stockholm, Sweden, a corporation of Sweden Application May 24, 1955, Serial No. 510,637

Claims priority, application Sweden June 22, 1954

5 Claims. (Cl. 74—209)

The present invention relates to a friction gearing in which a series of three rollers or balls, is placed within a hollow cylindrical body with an inner friction surface, inside this series a further series of three balls and in the middle a shaft located centrally. Such a structure has not been widely used primarily due to the difficulties encountered in the manufacture, which demands a very high degree of precision.

This invention has for its object to provide a construction which is easy to manufacture. This is achieved substantially by providing for the components of the structure such bearing conditions that the friction surface and the central shaft may occupy such positions, that their centre lines may be separated so much, that wide tolerances in the manufacture will be compensated. The bearing of the balls or rollers comprised in the gear are then suitably preformed in such a way, that the balls or the rollers may move in a radial direction so as to occupy the right positions for the friction of the gear. In a gearing of such design either the central shaft or the outer friction surface is supported solely in those rollers or balls, with which the respective element makes contact.

The invention will now be described more in detail with reference to the drawing.

Figure 1:
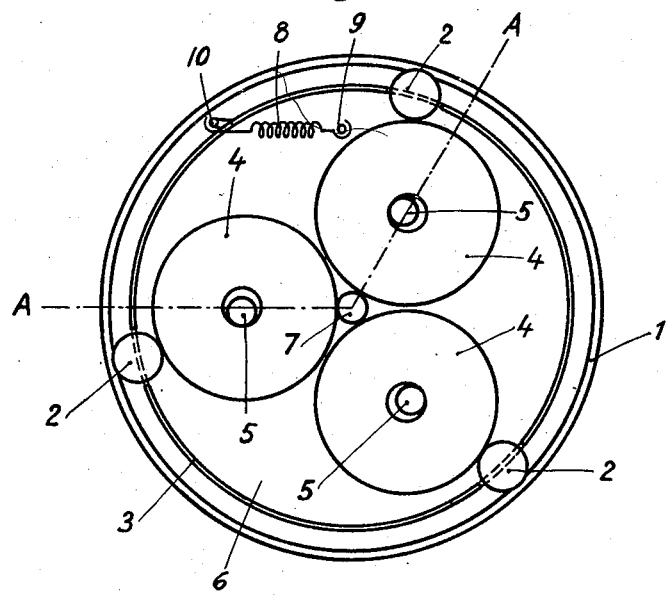
Fig. 1 is a plan view of the gearing.
Figure 2:
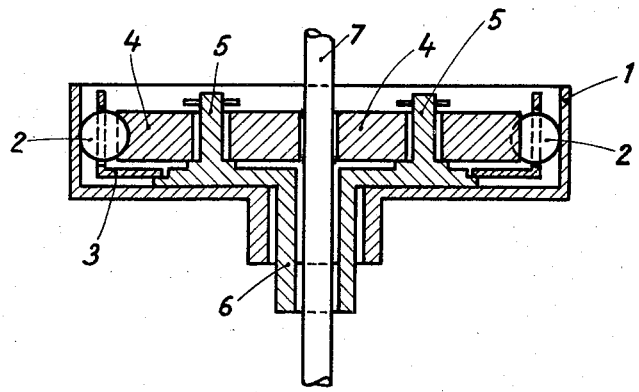
Fig. 2 is a section taken on line A—A of Fig. 1.

Inside the outer friction surface 1 there is a series of three balls 2 which are held in position by a ball holder 3. By means of a spring 8 secured by pins 10 and 9 to ball holder 3 and a roller holder 6, respectively, these balls are kept slightly pressed against the rollers 4 mounted on studs 5 which are rigidly secured to the roller holder 6. Centrally between the rollers is a shaft 7. If the outer friction surface 1 is turned clockwise according to Fig. 1, the balls 2 are forced by friction to be turned clockwise. The rollers 4 are then turned by the friction in counter clockwise direction and the central shaft 7 is turned clockwise. The gear ratio will then be equal to the relation between the inner diameter of the friction surface and the diameter of the central shaft.

If the parts included are dimensioned so, that the angle of action of the ball between the friction surface and the rollers is less than the angle of friction for the used material, no slide slip at the contact points will occur.

At first glance, it may seem that a construction as the one described above would require a high degree of precision at the manufacture. Such a precision has been tried at the beginning when efforts were made to put the construction into practice. This is however extremely expensive and it is furthermore almost impossible to achieve sufficient accuracy. When, however, the function of the gear is studied more closely, it appears that the great accuracy is not only not necessary, but can be disadvantageous to the function. If instead the bearing of the included elements are made with such great tolerances, or play, that the elements may be displaced in relation to each other, the elements will occupy the right positions for the function.

For the rollers and the balls this means that they individually are to move in a radial direction. In the exemplification shown in the drawing this has been achieved by the balls being caged in round holes in the ball holder, and by the rollers having holes for the studs of the roller holder, which holes are considerably larger than the studs. For the friction surface and the central shaft this requirement means that at least one of these elements must be supported solely in those balls or rollers, with which the respective element makes contact.

A possible difference in the size of the balls and the rollers or a faulty trisection for the ball holder or the roller holder will then not result in the gear being locked or moving with difficulty but only in the fact that the friction surface and the centre lines of the central shaft do not coincide but are displaced so much that the tolerances are compensated. Different embodiments of the gear may of course be considered, but all of them must fulfil the requirements claimed above to function well.

I claim:

1. A friction gearing comprising, in combination, a rotatable outer casing including an inwardly facing circular friction surface, a rotatable bearing shaft disposed centrally of and concentrically with said circular friction surface, a first bearing holder including a plurality of equally spaced studs rotatably supported relative to said casing and said shaft, a second bearing holder including a circular race having a plurality of spaced circular ball receiving openings and disposed between and concentric with said shaft and said friction surface, a roller supported for rotation within the plane of said race by each of said studs having a centrally located stud receiving opening of larger diameter than said respective stud for maintaining said roller in an adjustable position thereon, a ball bearing element supported for rotation within each of said circular openings of said race and having a substantially smaller diameter than the diameter of said respective circular openings, said rollers being adapted to be maintained in engagement with said shaft and certain of said balls, and said balls being adapted to be maintained in engagement with said respective rollers and said friction surface in an adjusted position relative thereto and to said enlarged ball receiving openings of said race, and spring means yieldably biasing said balls towards engagement with said friction surface and said rollers, the spring biasing of said balls being further operative to maintain said rollers in yieldable engagement with said shaft.

2. A friction gearing as set forth in claim 1, wherein said shaft is engaged solely by said rollers.

3. A friction gearing as set forth in claim 1, wherein said friction surface is engaged solely by said balls.

4. A friction gearing as set forth in claim 1, wherein said circular friction means, said race, and said shaft are supported for rotation about a common and substantially fixed axis, the axes of rotation of said rollers being parallel therewith and adjustable relative thereto, the position of said balls being adjustable circumferentially and radially relative to said race.

5. A friction gearing as set forth in claim 1, wherein the distance between said friction surface and the outer surface of said shaft is less than the sum of the diameters of one of said rollers and one of said balls, each of said rollers being adapted to be maintained in constant engagement with said shaft, and said spring means urging said respective ball into wedge-like engagement between said roller and said friction surface.

References Cited in the file of this patent

UNITED STATES PATENTS

| 1,093,922 | Dieterich | Apr. 21, 1914 |
| 1,106,246 | Schoedelin | Aug. 4, 1914 |

FOREIGN PATENTS

| 30,650 | France | Apr. 20, 1925 |
| | (Addition to No. 605,153) | |
| 117,878 | Great Britain | Aug. 8, 1918 |